US010489887B2

(12) United States Patent
El-Khamy et al.

(10) Patent No.: US 10,489,887 B2
(45) Date of Patent: Nov. 26, 2019

(54) SYSTEM AND METHOD FOR DEEP LEARNING IMAGE SUPER RESOLUTION

(71) Applicant: Samsung Electronics Co., Ltd., Suwon-si, Gyeonggi-do (KR)

(72) Inventors: Mostafa El-Khamy, San Diego, CA (US); Jungwon Lee, San Diego, CA (US); Haoyu Ren, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 15/671,036

(22) Filed: Aug. 7, 2017

(65) Prior Publication Data

US 2018/0293707 A1    Oct. 11, 2018

Related U.S. Application Data

(60) Provisional application No. 62/483,924, filed on Apr. 10, 2017.

(51) Int. Cl.
| | | |
|---|---|---|
| G06K 9/32 | (2006.01) |
| G06T 3/40 | (2006.01) |
| G06N 3/04 | (2006.01) |
| G06N 3/08 | (2006.01) |
| G06F 9/455 | (2018.01) |

(52) U.S. Cl.
CPC ......... *G06T 3/4076* (2013.01); *G06N 3/0454* (2013.01); *G06N 3/08* (2013.01); *G06T 3/4046* (2013.01); *G06T 3/4053* (2013.01); *G06T 3/4069* (2013.01); *G06F 9/45533* (2013.01)

(58) Field of Classification Search
CPC ...... G06N 3/0454; G06N 3/04; G06N 3/0427; G06N 3/084; G06K 9/00422; G06K 9/6256; G06K 9/6292; G06T 3/4069; G06T 3/4076; G06F 9/45533
See application file for complete search history.

(56) References Cited

U.S. PATENT DOCUMENTS

| | | |
|---|---|---|
| 5,659,666 A | 8/1997 | Thaler |
| 7,817,857 B2 | 10/2010 | Zhang et al. |

(Continued)

OTHER PUBLICATIONS

Liu, Ding, et al., "Learning a Mixture of Deep Networks for Single Image Super-Resolution", Beckman Institute, University of Illinois at Urbaba-Champaign, IL; Lane Department of Computer Science and Electrical Engineering, West Virginia University, WV, Jan. 3, 2017 (12 pages).

(Continued)

*Primary Examiner* — Bhavesh M Mehta
*Assistant Examiner* — Ian L Lemieux
(74) *Attorney, Agent, or Firm* — Lewis Roca Rothgerber Christie LLP (57) ABSTRACT

In a method for super resolution imaging, the method includes: receiving, by a processor, a low resolution image; generating, by the processor, an intermediate high resolution image having an improved resolution compared to the low resolution image; generating, by the processor, a final high resolution image based on the intermediate high resolution image and the low resolution image; and transmitting, by the processor, the final high resolution image to a display device for display thereby.

20 Claims, 7 Drawing Sheets

(56) References Cited

U.S. PATENT DOCUMENTS

| | | | |
|---|---|---|---|
| 7,916,971 B2* | 3/2011 | Bigioi | G03B 19/02 |
| | | | 382/275 |
| 2008/0152217 A1* | 6/2008 | Greer | G06N 3/04 |
| | | | 382/155 |
| 2013/0038758 A1* | 2/2013 | Imade | H04N 5/349 |
| | | | 348/231.99 |
| 2015/0254554 A1 | 9/2015 | Kato | |
| 2015/0363634 A1* | 12/2015 | Yin | G06K 9/00221 |
| | | | 382/118 |
| 2016/0240190 A1 | 8/2016 | Lee et al. | |
| 2017/0256033 A1* | 9/2017 | Tuzel | G06T 5/00 |
| 2017/0347061 A1* | 11/2017 | Wang | G06T 3/4046 |
| 2018/0075581 A1* | 3/2018 | Shi | G06T 3/4053 |
| 2018/0089803 A1* | 3/2018 | Zhang | G06K 9/00234 |
| 2018/0268284 A1* | 9/2018 | Ren | G06N 3/04 |

OTHER PUBLICATIONS

Miravet, Carlos, et al., "A two-step neural-network based algorithm for fast image super-resolution", Science Direct, Image and Vision Computing vol. 25, 2007, pp. 1449-1473.

* cited by examiner

SYSTEM AND METHOD FOR DEEP LEARNING IMAGE SUPER RESOLUTION

CROSS-REFERENCE TO RELATED APPLICATION

The present application claims priority to and the benefit of U.S. Provisional Application No. 62/483,924, entitled "DEEP LEARNING SYSTEM AND METHOD FOR IMAGE SUPER RESOLUTION WITH REAL-TIME PREVIEW," filed in the United States Patent and Trademark Office on Apr. 10, 2017, the entire content of which is incorporated herein by reference.

BACKGROUND

Image super-resolution is a process for generating or recovering a high resolution (HR) image from a single low resolution (LR) image. The input is a blurred or LR image. The output is a high resolution image. In certain applications, generating a high quality super resolution image based on a low resolution input image may be difficult in real time due to the amount of data processing power and time required to obtain the desired quality.

The above information disclosed in this Background section is only for enhancement of understanding of the background of the disclosure and therefore it may contain information that does not form prior art.

SUMMARY

Aspects of some example embodiments of the present disclosure relate to a system and method for deep learning image super resolution.

According to some example embodiments of the present disclosure, in a method for super resolution imaging, the method includes: receiving, by a processor, a low resolution image; generating, by the processor, an intermediate high resolution image having an improved resolution compared to the low resolution image; generating, by the processor, a final high resolution image based on the intermediate high resolution image and the low resolution image; and transmitting, by the processor, the final high resolution image to a display device for display thereby.

According to some example embodiments, the method further includes: receiving, by the processor, a signal from a user device requesting capture of the intermediate high resolution image; and generating, by the processor, the final high resolution image after receiving the signal from the user device.

According to some example embodiments, the method further includes: generating, by the processor, one or more intermediate high resolution images concurrently, each utilizing an individual convolution neural network; and storing, by the processor, the one or more intermediate high resolution image in a buffer.

According to some example embodiments, the method further includes: receiving, by the processor, a signal from a user device requesting capture of the one or more intermediate high resolution image; retrieving, by the processor, the one or more intermediate high resolution images from the buffer; and generating, by the processor, the final high resolution image after receiving the signal from the user device based on processing the one or more intermediate high resolution images from the buffer together with another convolutional neural network.

According to some example embodiments, the method further includes storing, by the processor, the low resolution image in a first buffer.

According to some example embodiments, the method further includes: generating, by the processor, the intermediate high resolution image utilizing a first individual convolution neural network; storing, by the processor, the intermediate high resolution image in a second buffer; receiving, by the processor, a signal from a user device requesting capture of the intermediate high resolution image; retrieving, by the processor, the low resolution image from the first buffer; and generating, by the processor, another intermediate high resolution image by a second individual convolution neural network.

According to some example embodiments, the method further includes: applying, by the processor, a first fusion layer with a first convolution kernel to an output image of the first individual convolution neural network to generate a first data set; applying, by the processor, a second fusion layer with a second convolution to an output image of the second individual convolution neural network to generate a second data set; and merging, by the processor, the first data set and the second data set to generate the final high resolution image.

According to some example embodiments, in a system for super resolution imaging, the system includes: a processor; and a memory coupled to the processor, wherein the memory stores instructions that, when executed by the processor, cause the processor to: receive a low resolution image; generate an intermediate high resolution image having an improved resolution compared to the low resolution image; generate a final high resolution image based on the intermediate high resolution image and the low resolution image; and transmit the final high resolution image to a display device for display thereby.

According to some example embodiments, the instructions further cause the processor to: receive a signal from a user device requesting capture of the intermediate high resolution image; and generate the final high resolution image after receiving the signal from the user device.

According to some example embodiments, the instructions further cause the processor to: generate one or more intermediate high resolution images concurrently, each utilizing an individual convolution neural network; and store the one or more intermediate high resolution image in a buffer.

According to some example embodiments, the instructions further cause the processor to: receive a signal from a user device requesting capture of the one or more intermediate high resolution image; retrieve the one or more intermediate high resolution image from the buffer; and generate the final high resolution image after receiving the signal from the user device based on processing the one or more intermediate high resolution images from the buffer together with another convolutional neural network.

According to some example embodiments, the instructions further cause the processor to store the low resolution image in a first buffer.

According to some example embodiments, the instructions further cause the processor to: generate the intermediate high resolution image utilizing a first individual convolution neural network; store the intermediate high resolution image in a second buffer; receive a signal from a user device requesting capture of the intermediate high resolution image; retrieve the low resolution image from the first buffer; and generate another intermediate high resolution image by a second individual convolution neural network.

According to some example embodiments, the instructions further cause the processor to: apply a first fusion layer with a first convolution kernel to an output image of the first individual convolution neural network to generate a first data set; apply a second fusion layer with a second convolution kernal to an output image of the second individual convolution neural network to generate a second data set; and merge the first data set and the second data set to generate the final high resolution image.

According to some example embodiments, in a system for super resolution imaging, the system includes: a processor; and a memory coupled to the processor, wherein the memory stores instructions that, when executed by the processor, cause the processor to: receive a low resolution image; generate an intermediate high resolution image having an improved resolution compared to the low resolution image; generate a final high resolution image based on the intermediate high resolution image and the low resolution image; receive a signal from a user device requesting capture of the intermediate high resolution image; generate the final high resolution image after receiving the signal from the user device; and transmit the final high resolution image to a display device for display thereby.

According to some example embodiments, the instructions further cause the processor to: generate the intermediate high resolution image utilizing an individual convolution neural network; and store the intermediate high resolution image in a buffer.

According to some example embodiments, the instructions further cause the processor to: receive a signal from a user device requesting capture of the intermediate high resolution image; retrieve the intermediate high resolution image from the buffer; and generate the final high resolution image after receiving the signal from the user device based on the intermediate high resolution image from the buffer.

According to some example embodiments, the instructions further cause the processor to store the low resolution image in a first buffer.

According to some example embodiments, the instructions further cause the processor to: generate the intermediate high resolution image utilizing a first individual convolution neural network; store the intermediate high resolution image in a second buffer; receive a signal from a user device requesting capture of the intermediate high resolution image; retrieve the low resolution image from the first buffer; and generate another intermediate high resolution image by a second individual convolution neural network.

According to some example embodiments, the instructions further cause the processor to: apply a first fusion layer with a first convolution kernel to an output image of the first individual convolution neural network to generate a first data set; apply a second fusion layer with a second convolution kernal to an output image of the second individual convolution neural network to generate a second data set; and merge the first data set and the second data set to generate the final high resolution image.

BRIEF DESCRIPTION OF THE DRAWINGS

A more complete appreciation of the present disclosure, and many of the attendant features and aspects thereof, will become more readily apparent as the disclosure becomes better understood by reference to the following detailed description when considered in conjunction with the accompanying drawings, wherein.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey some of the aspects and features of the present disclosure to those skilled in the art. Accordingly, processes, elements, and techniques that are not necessary to those having ordinary skill in the art for a complete understanding of the aspects and features of the present disclosure are not described with respect to some of the embodiments of the present disclosure. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section described below could be termed a second element, component, region, layer or section, without departing from the scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a," and "an" are intended to include the plural forms as well, unless the context clearly indicates otherwise. It will be further understood that the terms "comprises," "comprising," "includes," and/or "including" when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure." Also, the term "exemplary" is intended to refer to an example or illustration.

It will be understood that when an element or layer is referred to as being "on," "connected to," "connected with," "coupled to," or "adjacent to" another element or layer, it can be directly on, connected to, coupled to, or adjacent to the other element or layer, or one or more intervening elements or layers may be present. When an element or layer is referred to as being "directly on," "directly connected to," "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A super resolution imaging system is an electronic system configured to generate or recover a high resolution (HR) image based on a single low resolution (LR) image. Single image super resolution refers to producing a single HR image from one LR image. Multi-image super resolution refers to producing a HR image from multiple images obtained at different temporal, angular or spatial dimensions and which need to be aligned in subpixel accuracy.

Super resolution (SR) imaging is becoming increasingly important in a variety of scenarios and applications. For example, super resolution imaging may be utilized to improve the perceptual quality of web images and videos that are present in compressed or down-sampled format. Super resolution imaging may also be utilized in a digital zoom process for digital cameras, whether standalone or cell phone cameras. Super resolution imaging has additional benefits for a variety of scientific fields and applications that rely on collecting and analyzing images. For example, super resolution imaging may be utilized to improve the quality of microscopy images.

In some applications, real-time performance (e.g., the speed and quality in which a higher resolution image is generated from a lower resolution image) of a super resolution imaging system may be an important factor for the quality and usefulness of the system. For example, in the context of Internet or web browser applications, it may be useful to provide fast Internet browsing while observing a higher perceptual quality of the images. Fast and high-quality real time super resolution imaging may also be beneficial for improving the perceived quality of digital zoom functionality on the view finder or display of a digital camera.

Similarly, in microscopy users may appreciate the benefit of being able to observe higher resolution images in real-time. For example, in the context of light microscopy, a subject that is smaller than a certain threshold size (e.g., smaller than 250 nanometers (nm) across) may appear blurred, which may limit or prevent the user from analyzing the subject in the microscopy image. Thus, super-resolution microscopy may enable objects to be analyzed at a much smaller scale, with less impact from the diffraction limits of the lens. In other circumstances, users may benefit from being able to have real time observation of the molecular observations. Thus, in a variety of applications, such as digital zoom functionality on digital cameras, light microscopy, and web browsing, users of a super resolution imaging system may benefit from high quality real time performance, and enhanced offline performance.

Additionally, for the above-mentioned applications, offline performance for image processing at acquisition time is also of importance. In such applications, offline performance can be triggered, for example, by clicking on an image in a browser or saving it, by taking a snapshot from the camera using digital zoom, by recording a video or movie with digital zoom, or by taking a snapshot or recording the microscope output.

Thus, example embodiments of the present disclosure include a system and method for super resolution imaging operable in two modes: (1) a preview mode that is fast enough to generate higher resolution images in real-time (e.g., without any significant perceptible delay) with enhanced quantitative and qualitative perceptual quality compared to a lower resolution input image; and (2) an offline mode for post-processing at acquisition that does not generate an output high resolution image as quickly as the preview mode, but the output image has a higher resolution than the image generate in the preview mode.

Some example embodiments of the present disclosure include a system and method of providing deep-learning based super-resolution imaging with a preview mode and an offline mode. According to some example embodiments, the computations done in preview mode are leveraged in the offline mode. According to some example embodiments, a system and method includes a super resolution imaging system that retrieves information from low-resolution (LR) images to generate or produce high-resolution (HR) output images. The present system may be achieved by learning very deep convolution neural networks.

Thus, as described above, some example embodiments of the present disclosure include a dual mode SR system and method. According to some example embodiments, a system and method includes deep learning based SR that leverages the computations done for real-time SR while in the preview mode for the offline SR mode. Hence, the present system provides a mechanism for balancing tradeoffs between accuracy and efficiency.

A system and method according to some example embodiments includes a preview network and one or more refine networks. As will be described in more detail below, some example embodiments may utilize one of two deep learning architectures described herein: a progressive super resolution system; and a parallel-fused super resolution system.

As described in more detail below, in the progressive super resolution system, the "preview" network and the "refine" networks may be trained successively. By contrast, in the context-wise parallel fused super resolution system, a context-wise fusion layer for context-wise fusion of the multiple networks in parallel may be utilized. Run-time procedures for using the preview networks and the refine network for both cases are discussed in more detail below.

Figure 1:
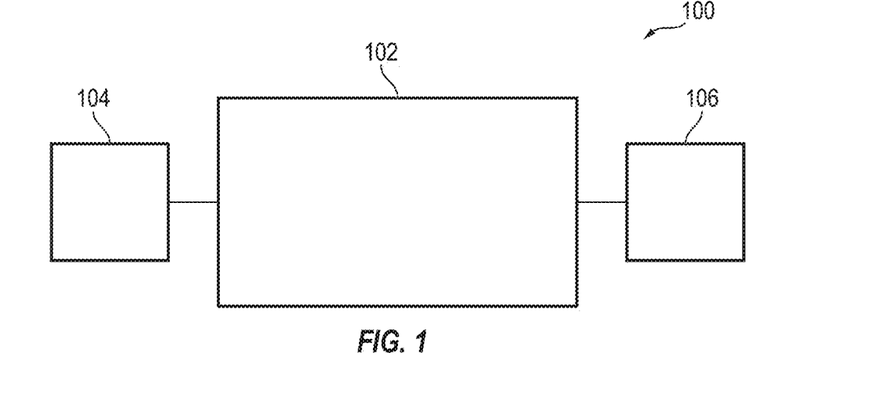
FIG. 1 is a block diagram illustrating aspects of a deep learning image super resolution system, according to some example embodiments of the present disclosure.

FIG. 1 is a block diagram illustrating aspects of a deep learning image super resolution system, according to some example embodiments of the present disclosure. As illustrated in FIG. 1, a super resolution imaging system 100 according to some example embodiments includes an image processing system 102. The image processing system 102 is in electronic communication with an image source device 104 and an image output device 106. The image source device 104 may be any electronic device configured to capture and/or store a digital image, such as a digital microscope, a digital camera, a computer operating an Internet website, and a personal computer system. The image output device 106 may be any suitable electronic device configured to receive a super resolution image based on a low resolution image. For example, the image output device 106 may be a display device or computer system for displaying a high resolution image. As will be described in more detail below, the super resolution imaging system 100 is configured to receive a low resolution image from the image source device 104 and generate a super resolution image based on the low resolution image to provide to the image output device 106.

Figure 2:
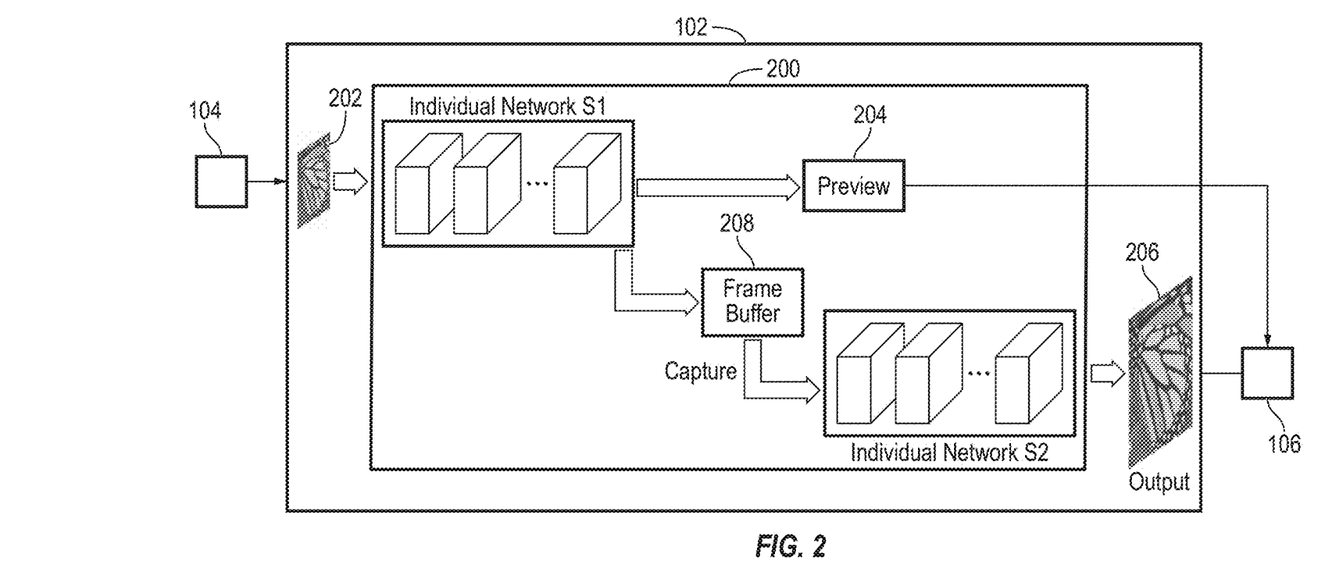
FIG. 2 is a block diagram illustrating aspects of a progressive fusion system according to some example embodiments of the present disclosure.

According to some example embodiments, systems and methods of the present disclosure may utilize one of two deep learning architectures described herein: a progressive super resolution system; and a parallel-fused super resolution system. FIG. 2 is a block diagram illustrating aspects of a progressive fusion system according to some example embodiments of the present disclosure.

Referring to FIG. 2, the super resolution imaging system 100 may include a progressive fusion SR imaging system 200, configured to provide progressive super resolution, via progressive fusion, to allow for super resolution imaging to generate an intermediate high resolution image as a preview image in a preview mode, and to generate a high resolution image (e.g., having a higher resolution than the intermediate high resolution image) in a non-preview or offline mode.

As illustrated in FIG. 2, the progressive fusion SR imaging system 200 includes a first individual super resolution network $S_1$. The first individual super resolution network $S_1$ is configured to receive an LR input image 202 (from the image source device 104) and generate an intermediate quality high resolution image (e.g., as a preview image) for providing to a display device and/or the image destination device 106. The first individual super resolution network $S_1$ may generate the intermediate quality high resolution image using any suitable super resolution imaging algorithm or process known in the art.

According to some example embodiments, the first individual super resolution network $S_1$ includes any suitable convolution neural network architecture. According to some example embodiments, the first individual super resolution network $S_1$ may have relatively low complexity (e.g., having relatively low computational costs in generating the output data). The output of the neural network is a feed forward process based on multiplication-and-accumulations of input (e.g., the LR input image) and the weights (e.g., network parameters). If the network is smaller (e.g., because there are relatively fewer layers and filters), the computational costs will be smaller. Accordingly, the network $S_1$ can generate the intermediate high resolution image 204 based on the input image in real time (e.g., with little or no perceived delay in generating and displaying the image). The baseline of "real time" according to embodiments of the present disclosure is 15 frames per second. Thus, according to some example embodiments of the present disclosure, the processing time for generating an intermediate output image by the first individual super resolution network $S_1$ is less than 1/15 of a second. Under such conditions, a human eye will not perceive any delay.

According to some example embodiments, the first individual super resolution network $S_1$ receives the LR input image 202, or alternatively, a bicubic upsampled version of the LR input image 202, where the upsampling ratio is according to a target upsampling ratio. The output $y_1$ of $S_1$ given the input $x_1$ can be represented by equation (1) below:

$$y_1 = S_1(x_1). \tag{1}$$

The first individual super resolution network $S_1$ is trained to provide an output $y_1$ that has enough super resolution perceptual quality for enhanced user experience or user perception of the quality of the image. For example, for a camera application, the intermediate high resolution image 204 may be a zoomed-in version of the LR input image 202 (e.g., at a scale that is a multiple (e.g., 3 times the size) of the size of the LR input image 202), with the same or higher resolution as the input image 202, around an area of interest in the raw image as from the optical lens. Such increased scaling and image resolution may enable, for example, a user to scan for, and increase the clarity of, objects of interest in the zoomed image, read small text, and the like. Thus, the intermediate high resolution image 204 may be provided to and displayed on a device operated by a user that is in electronic communication with or incorporated as part of the super resolution imaging system 100.

According to some example embodiments, once the user is satisfied with a current frame and wants to capture the image, the user may transmit a signal (e.g., by selecting a button or prompt in a user interface for interacting with the progressive fusion SR imaging system 200) to the progressive fusion SR imaging system 200 to generate the high resolution image 206.

The intermediate high resolution image 204 (e.g., the output $y_1$) may also be stored in a temporal frame buffer 208 upon being generated by the first individual super resolution network $S_1$. Then, in response to receiving the signal from the user (or a device operated by the user) indicating the user desires to capture the image, the intermediate high resolution image 204 (e.g., the output $y_1$) is retrieved from the temporal frame buffer 208, and provided to a second individual super resolution network $S_2$ to generate the high resolution image 206.

In particular, the super resolution image generated as output from the preview network $S_1$ is used as an intermediate high resolution imager preview and is buffered in a temporal frame buffer 208 for further super resolution imaging to generate a final high resolution image based on the original low resolution input image and the intermediate high resolution image. If the frame is captured, the super resolution output of the first individual super resolution network $S_1$ is provided as input to the second individual super resolution network $S_2$, to provide an enhanced super resolution quality at the same desired scale. The input and output resolutions of the second individual super resolution network $S_2$ are the same, but the output of the second individual super resolution network $S_2$ has a better perceptual quality.

For example, according to some example embodiments, the output of the second individual super resolution network $S_2$ e.g., has a higher Peak Signal-to-Noise Ratio (PSNR) or a higher Structural Similarity Measure (SSIM)).

PSNR is the ratio between the maximum possible power of an image pixel and the power of corrupting noise that affects the fidelity. PSNR may be calculated according to equation (2), below:

$$PSNR = 20 \log_{10} \frac{255}{\sqrt{MSE}} \quad (2)$$

In equation (2), the MSE is calculated between the ground truth and a reconstructed image (SR output). Larger PSNR corresponds to better quality. The maximum value of PSNR is infinite.

SSIM is a perception-based model that considers image degradation as perceived change in structural information, while also incorporating the luminance masking and contrast masking. It shows better consistency to human vision compared to PSNR. SSIM may be calculated according to equation (3), below:

$$SSIM = 20 \log_{10} \frac{(2\mu_x\mu_y + c_1)(2\sigma_{xy} + c_2)}{(\mu_x^2 + \mu_y^2 + c_1)(\sigma_x^2 + \sigma_y^2 + c_2)} \quad (3)$$

where x is the reconstructed image, y is the reference image (ground truth), $\mu$ is the mean, $\sigma$ is the variance, and $\sigma_{xy}$ is the covariance between x and y. $c_1$=6.5025, $c_2$=58.5225. SSIM lays between [0,1]. If the x is a perfect copy of y, the SSIM will be 1.

The high resolution image 206 may be generated by the second individual super resolution network $S_2$ based on the intermediate high resolution image 204 and the LR input image 202 using any suitable super resolution imaging algorithm or process known in the art.

The output of second stage can be represented by the following equation (4), below:

$$y_2 = S_2(S_1(x_1)) \quad (4)$$

Because this is performed offline, more processing power and latency can be tolerated before the output is stored in memory.

According to some example embodiments, multiple progressive super resolution stages (e.g., additional individual super resolution networks $S_a$, where "a" is a natural number greater than 2) can be cascaded with the first and second individual super resolution networks $S_1$ and $S_2$, to get progressively better super resolution quality, with the output of each stage provided as input to the next stage. For example, a second stage may be executed on a mobile device, while a third stage may be executed by offline software operating on an external computing machine or a cloud server having higher data processing power and throughput. Each output from each stage is a meaningful output that can be considered a super resolution output image. If the output from a particular stage is satisfactory or desired, a subsequent stage may not be invoked. A desired image may be based on a number of factors, such as perceptual quality, output generation speed, computation power, or a storage memory requirement, according to the design and function of the super resolution imaging system 100 and the needs and desires of individual users.

Figure 3:
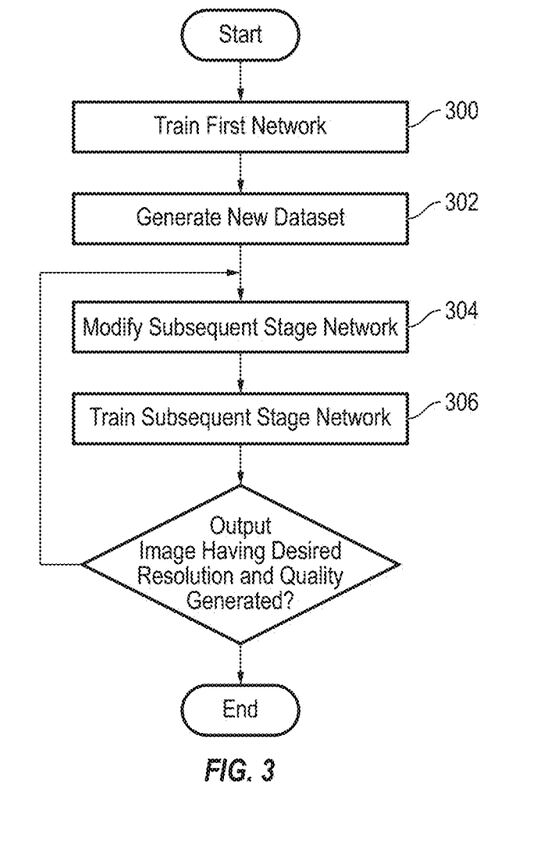
FIG. 3 is a flow diagram illustrating a process for training a progressive fusion super resolution imaging system, according to some example embodiments.

A process for training the progressive fusion SR imaging system 200 operating as part of the super resolution imaging system 100, according to some example embodiments, is illustrated in FIG. 3. First, at 300, the super resolution imaging system 100 trains a first network (e.g., first individual super resolution network $S_1$) using pairs of patches from input low resolution images downscaled to a target scale and output ground truth images. Second, at 302, the super resolution imaging system 100 generates a new dataset, having pairs of patches from the intermediate high resolution output from the first network and the ground truth. Third, at 304, the super resolution imaging system 100 then modifies a subsequent stage network to perform appropriate resizing at output of each convolutional layer (as stretching or padding) to enforce same input and output sizes. Fourth, at 306, the super resolution imaging system 100 then trains a subsequent stage network using the new dataset. Then, at 308, the super resolution imaging system 100 determines whether or not an output image having a desired resolution and perceived quality (e.g., a predefined threshold quality) has generated. If not, the super resolution imaging system 100 repeats 304 and 306 until a desired resolution and perceived quality is generated, at which the image is provided as an HR output image.

For multiple stages with common network architecture, the networks can be initialized by that of a previous stage when training the next stage network, which may speed up the convergence of training a subsequent stage network.

According to some example embodiments, a super resolution imaging system 100 having a progressive 3-layer and 5-layer network structure may provide a relatively better peak signal-to-noise ratio (PSNR) and structure similarity measure (SSIM) as compared to non-progressive 3-layer and 5-layer network structure. The super resolution imaging system 100 described above may further be applied to context-wise fused network.

According to some example embodiments, the super resolution imaging system 100 provides parallel fusion to achieve dual mode super resolution with deep learning. If the offline step includes multiple stages in the progressive super resolution system, a latency may be introduced. In some instances, such latency may be desired, because the networks of the different stages may not be collocated.

However, if the networks are collocated, the super resolution imaging system 100 may invoke multiple stages of the capture mode in parallel. In such embodiments, super resolution imaging system 100 may fuse the multiple stages of the capture step (e.g., the step of generating the final high resolution output image using the second individual super resolution network $S_2$ after the user chooses to capture the high resolution image based on the preview image) in parallel with the output of the preview stage. Assuming sufficient parallel processing power, the latency with parallel processing is limited to that of the slowest fused network in the capture stage.

According to some embodiments, the super resolution imaging system 100 may provides pixel wise fusion for parallel fusion at the capture step. For example, all of the super resolution networks are trained for the same ground truth and have the same image size at their output. For example, if $S_i(x_i)$ is the output of the ith network, then with pixel-wise fusion, the output at the (u,v)th pixel of the parallel fused network is a weighted sum as can be calculated according to equation (5), below:

$$y_{u,v} = \Sigma_j w_j S_{j,(u,v)} + b_j \quad (5)$$

Figure 4:
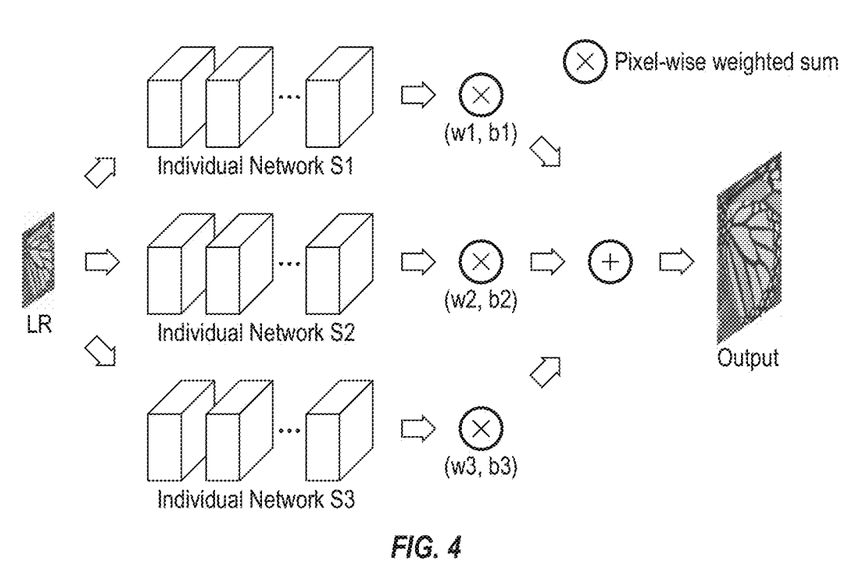
FIG. 4 is an example diagram for pixel wise fusion, according to some example embodiments.

FIG. 4 is an example diagram for pixel wise fusion, according to some example embodiments, in which a pixel-wise weighted sum is applied to the output image of a plurality of individual super resolution networks, and the sum of each of which is provided as the output image. For applications such as super resolution, looking at a pixel independently of its neighbors may not be very useful. Thus, according to one embodiment, the present system and method incorporates contextual information about the pixel as predicted from each network before producing the fused output. This may be achieved by fusion using a convolution layer.

A related convolutional layer applies a three-dimensional (3D) kernel, where the size of the $3^{rd}$ dimension is the number of input channels in each layer. In the pixel-wise fused network, the output for a given pixel is the weighted sum across the convoluted output, i.e., the weighted sum of the surroundings of this pixels, which gives the contextual information, from all fused networks as determined by the size of the kernel. Moreover, the additional convolutional layers can be inserted to further get a weighted sum of the features obtained after fusions.

Figure 5:
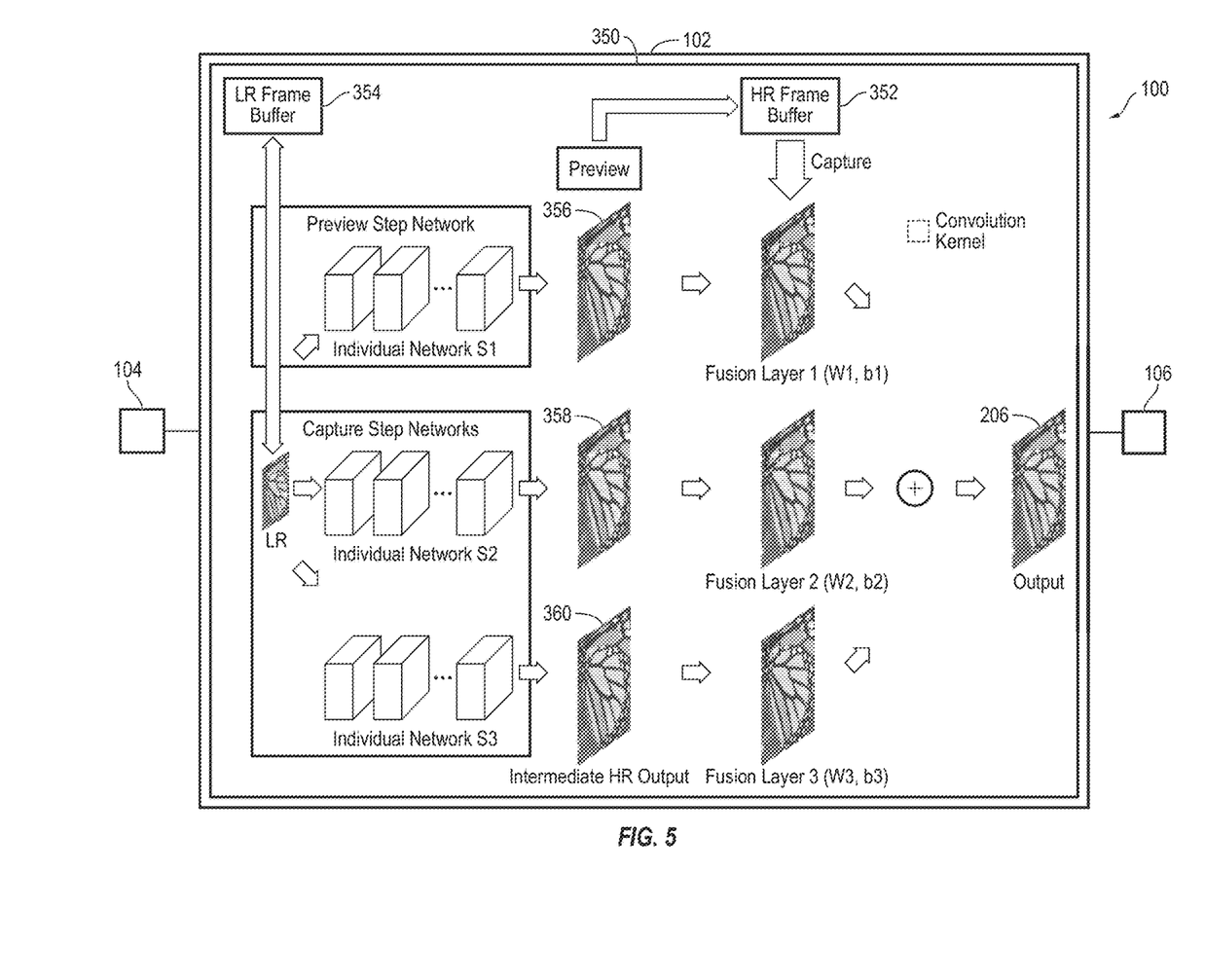
FIG. 5 is a block diagram of a super resolution imaging system utilizing a context wise fusion architecture, according to some example embodiments.

FIG. 5 is a block diagram of a super resolution imaging system 100 utilizing a context wise fusion architecture 350, according to some example embodiments. Similar to progressive super resolution imaging as described above with respect to FIG. 2, a buffer 352 is used to buffer the intermediate high resolution output of an individual preview network $S_1$. However, another buffer 354 may be utilized to buffer the original low resolution frame as well, to feed to the other super resolution imaging networks in parallel at the capture or offline mode.

As illustrated in FIG. 5, a first individual super resolution network $S_1$ operating as a preview step network may receive an LR input image 202, as described above with respect to FIG. 2. Additionally, the LR input image 202 is stored in a low resolution frame buffer 354. The output image 356 of the first individual super resolution network $S_1$ is then stored as an intermediate high resolution preview image in the high resolution frame buffer 352. Upon receiving a capture signal from a user device indicating the user wishes to generate a final high resolution image of the preview image, one or more capture step networks (e.g., individual super resolution networks $S_2$ and $S_3$) retrieve the LR input image 202 from the low resolution frame buffer 354 to generate respective intermediate high resolution images 358 and 360. The intermediate high resolution images 356, 358, and 360 may be generated using any suitable super resolution imaging algorithm or process known in the art. Then corresponding fusion layers with convolution kernels are applied to the intermediate high resolution images 356, 358, and 360, and the output of each is merged into a high resolution image 206 to be provided to the output device 106. The merging is based on the context-wise fusion, which first convolves the high resolution images 356, 358, and 360 by individual fusion layer (W1, b1)(W2, b2)(W3, b3) and then sums them together to obtain the refined HR image 206. Similar to equation (5), if $S_i(x_i)$ is the output of the ith network, then with context fusion, the output at the (u,v)th pixel is a weighted sum as can be calculated according to equation (5). The weighted sum is implemented implicitly with the context convolutional layer, having a k×k×M convolutional kernel, where M is the number of networks to be fused (M=3). In this example, k×k is the context fusion receptive field, where (y,x) pixel of output channel $Y_o$ is given by equation (6), below:

$$Y_o(y,x) = \Sigma_{m=1}^{M} \Sigma_{r=0}^{k-1} \Sigma_{s=0}^{k-1} W(m,r,s) I(m, y+r, x+s) \quad (6)$$

Because the receptive field is much larger compared to pixel-wise fusion, the perceptive quality of the output HR is better.

Figure 6:
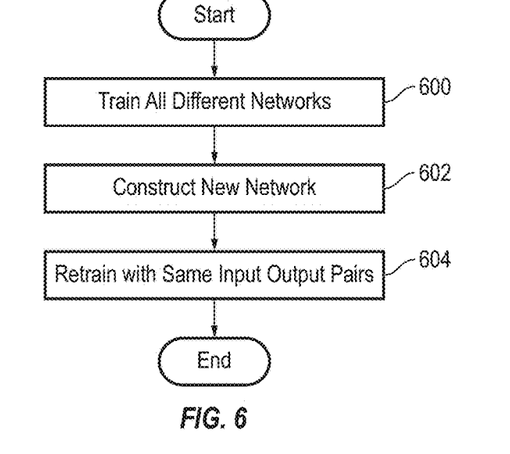
FIG. 6 is a flow diagram illustrating a process for training the parallel context-wise fusion network for dual mode super resolution, according to some example embodiments.

A process for training the parallel context-wise fusion network for dual mode super resolution, according to some example embodiments, is illustrated in FIG. 6. First, at 600, the super resolution imaging system 100 trains all different networks using pairs of patches from input low resolution images downscaled to target scale and output ground truth images. Second, at 602, the super resolution imaging system 100 constructs a new network as shown with one or more context fusion layers utilizing 3 dimensional convolutional kernels, appended to the output of the 3 networks, initialized by Gaussian distribution.

Then, at 604, according to some embodiments, the super resolution imaging system 100 may retrain with the same input output pairs, while freezing weights of all individual super resolution networks and changing the weights of the context wise fusion layers. Alternatively, according to some embodiments, the super resolution imaging system 100 retrains with the same input output pairs, while allowing fine tuning of the parameters of all layers except for those of the preview network.

It can be observed that the training procedure is faster than progressive super resolution imaging. In the second scenario, in which the super resolution imaging system 100 retrains with the same input output pairs, the weights of the preview network may be frozen to leverage the computations done during the preview mode. The output from the preview stage is fed directly into the context wise fusion stage and the preview network need not be rerun again.

The application of progressive super resolution imaging or parallel context-wise fusion depends on the objectives of the user and the design and function of the super resolution imaging system 100. If all networks are collocated, the best performance may be achieved with parallel context wise fusion. Otherwise, for delayed application of the next stages, the progressive super resolution fusion architecture may achieve superior results.

According to some example embodiments, a super resolution imaging system 100 provides cascade fusion including a preview network and at least one refinement network, a method for training the networks, and a method for operation of progressive super resolution imaging. According to another embodiment, the super resolution imaging system 100 provides parallel fusion including a preview network, at least one refinement network, and context-wise fusion layers, a method for training the networks and their fusion layers, and a method for operation in preview mode and refinement modes.

Figure 7A:
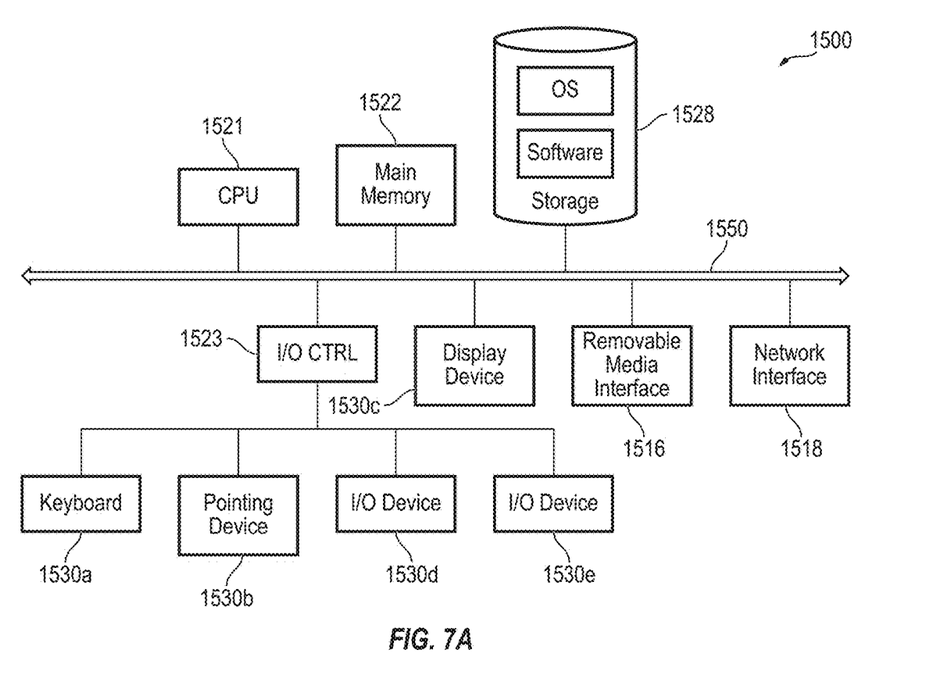
FIG. 7A is a block diagram of a computing device according to an embodiment of the present disclosure.
Figure 7B:
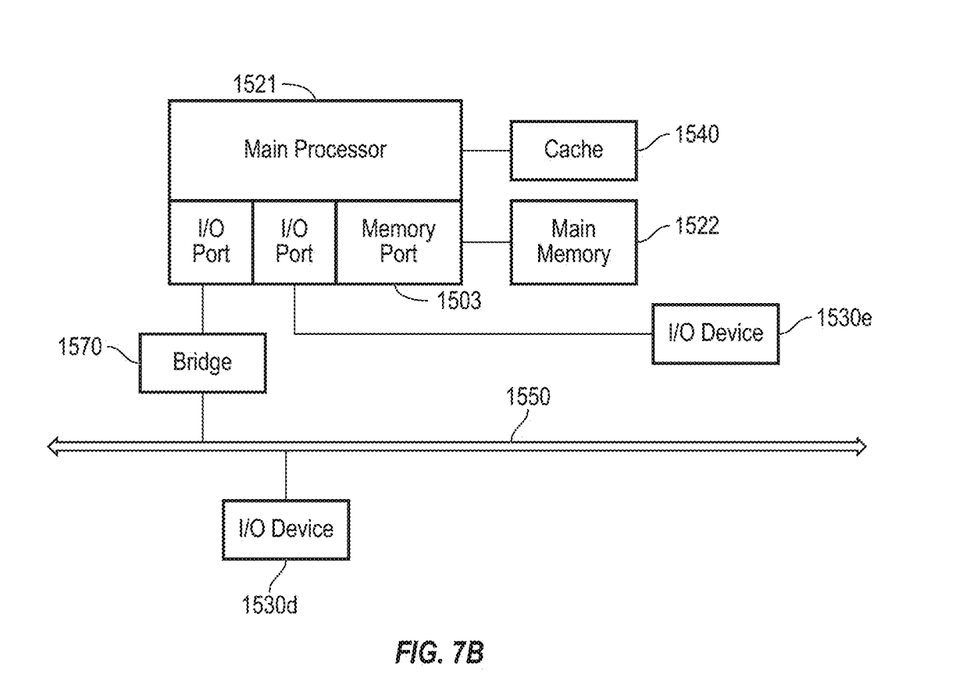
FIG. 7B is a block diagram of a computing device according to an embodiment of the present disclosure.

FIG. 7A and FIG. 7B depict block diagrams of a computing device 1500 as may be employed in example embodiments of the present disclosure. For example, the computing device 1500 may be utilized for the various components of the super resolution imaging system 100.

Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory unit 1522 via a system bus 1550. As shown in FIG. 7B, the central processing unit 1521 may also communicate directly with the main memory unit 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory unit 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 7C:
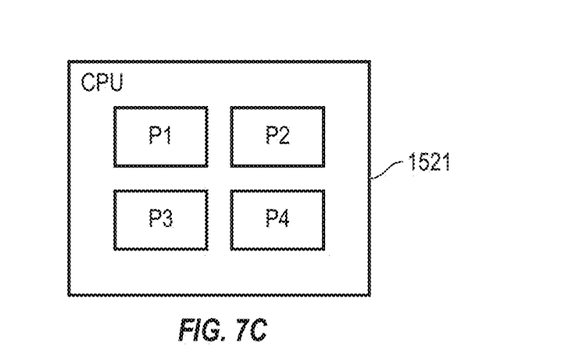
FIG. 7C is a block diagram of a computing device according to an embodiment of the present disclosure.
Figure 7D:
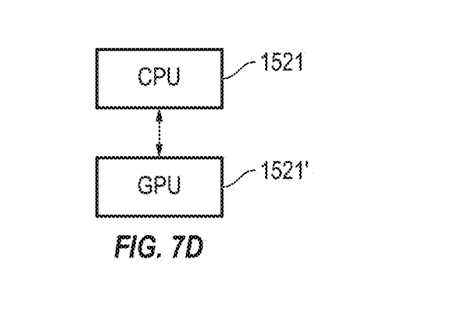
FIG. 7D is a block diagram of a computing device according to an embodiment of the present disclosure.

As shown in FIG. 7C, the central processing unit 1521 may include multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one example embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
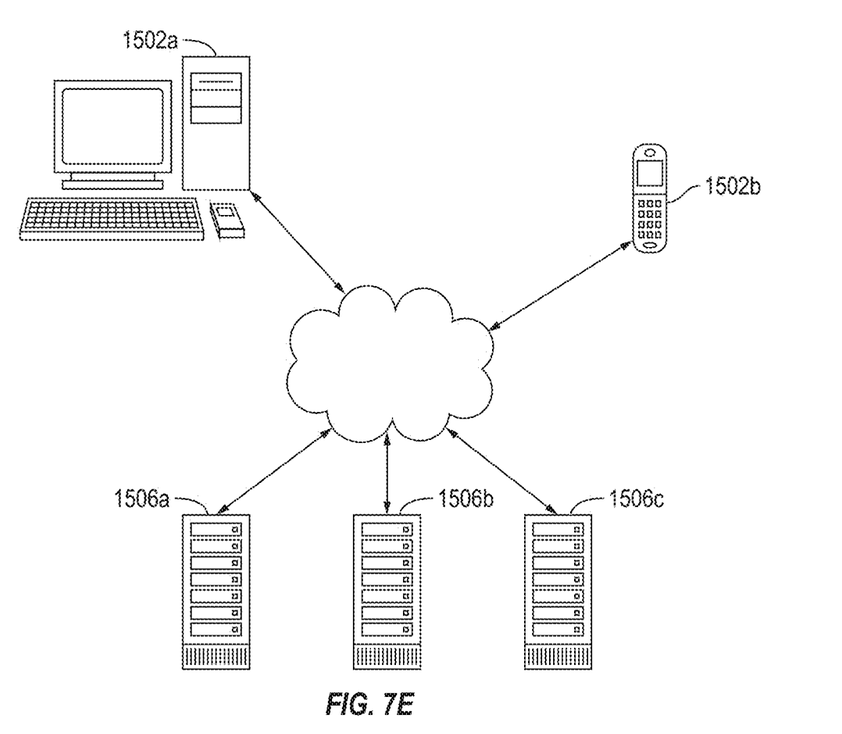
FIG. 7E is a block diagram of a network environment including several computing devices according to an embodiment of the present disclosure.

A computing device may be one of a plurality of machines connected by a network, or it may comprise a plurality of machines so connected. FIG. 7E shows an example network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating systems may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Although this disclosure has been described in certain specific embodiments, those skilled in the art will have no difficulty devising variations to the described embodiment, which in no way depart from the scope of the present disclosure. Furthermore, to those skilled in the various arts, the disclosure itself herein will suggest solutions to other tasks and adaptations for other applications. It is the applicant's intention to cover by claims all such uses of the disclosure and those changes and modifications which could be made to the embodiments of the disclosure herein chosen for the purpose of disclosure without departing from the scope of the disclosure. Thus, the present embodiments of the disclosure should be considered in all respects as illustrative and not restrictive, the scope of the disclosure to be indicated by the appended claims and their equivalents rather than the foregoing description.

What is claimed is:

1. A method for super resolution imaging, the method comprising:
   receiving, by a processor, a low resolution image;
   generating, by the processor, one or more intermediate high resolution images having an improved resolution compared to the low resolution image, wherein each intermediate high resolution image is generated by an individual convolutional neural network;

generating, by the processor, a final high resolution image based on the intermediate high resolution images using a cascaded convolutional neural network; and transmitting, by the processor, the final high resolution image to a display device for display thereby.

2. The method of claim 1, further comprising:

receiving, by the processor, a signal from a user device requesting capture of the one or more intermediate high resolution images; and generating, by the processor, the final high resolution image after receiving the signal from the user device.

3. The method of claim 1, further comprising:

storing, by the processor, the one or more intermediate high resolution images in a buffer.

4. The method of claim 3, further comprising:

receiving, by the processor, a signal from a user device requesting capture of the one or more intermediate high resolution images;

retrieving, by the processor, the one or more intermediate high resolution images from the buffer; and generating, by the processor, the final high resolution image after receiving the signal from the user device based on processing the one or more intermediate high resolution images from the buffer together with an additional convolutional neural network.

5. The method of claim 1, further comprising storing, by the processor, the low resolution image in a first buffer.

6. The method of claim 5, further comprising:

generating, by the processor, the one or more intermediate high resolution images utilizing a first individual convolutional neural network;

storing, by the processor, the one or more intermediate high resolution images in a second buffer;

receiving, by the processor, a signal from a user device requesting capture of the one or more intermediate high resolution images;

retrieving, by the processor, the low resolution image from the first buffer; and generating, by the processor, another intermediate high resolution image by a second individual convolutional neural network.

7. The method of claim 6, further comprising:

applying, by the processor, a first fusion layer with a first convolution kernel to an output image of the first individual convolutional neural network to generate a first data set;

applying, by the processor, a second fusion layer with a second convolution kernel to an output image of the second individual convolutional neural network to generate a second data set; and merging, by the processor, the first data set and the second data set to generate the final high resolution image.

8. A system for super resolution imaging, the system comprising:

a processor; and a memory coupled to the processor, wherein the memory stores instructions that, when executed by the processor, cause the processor to:

receive a low resolution image;

generate an intermediate high resolution image having an improved resolution compared to the low resolution image using a convolutional neural network;

generate a final high resolution image based on the intermediate high resolution image and the low resolution image by processing the intermediate high resolution image and the low resolution image together with an additional convolutional neural network; and transmit the final high resolution image to a display device for display thereby.

9. The system of claim 8, wherein the instructions further cause the processor to:

receive a signal from a user device requesting capture of the intermediate high resolution image; and generate the final high resolution image after receiving the signal from the user device.

10. The system of claim 8, wherein the instructions further cause the processor to:

generate one or more intermediate high resolution images concurrently, each utilizing an individual convolutional neural network; and store the one or more intermediate high resolution images in a buffer.

11. The system of claim 10, wherein the instructions further cause the processor to:

receive a signal from a user device requesting capture of the one or more intermediate high resolution images;

retrieve the one or more intermediate high resolution images from the buffer; and generate the final high resolution image after receiving the signal from the user device based on processing the one or more intermediate high resolution images from the buffer together with the additional convolutional neural network.

12. The system of claim 8, wherein the instructions further cause the processor to store the low resolution image in a first buffer.

13. The system of claim 12, wherein the instructions further cause the processor to:

generate the intermediate high resolution image utilizing a first individual convolutional neural network;

store the intermediate high resolution image in a second buffer;

receive a signal from a user device requesting capture of the intermediate high resolution image;

retrieve the low resolution image from the first buffer; and generate another intermediate high resolution image by a second individual convolutional neural network.

14. The system of claim 13, wherein the instructions further cause the processor to:

apply a first fusion layer with a first convolution kernel to an output image of the first individual convolutional neural network to generate a first data set;

apply a second fusion layer with a second convolution kernel to an output image of the second individual convolutional neural network to generate a second data set; and merge the first data set and the second data set to generate the final high resolution image.

15. A system for super resolution imaging, the system comprising:

a processor; and a memory coupled to the processor, wherein the memory stores instructions that, when executed by the processor, cause the processor to:

receive a low resolution image;

generate one or more intermediate high resolution image having an improved resolution compared to the low resolution image, wherein each intermediate high resolution image is generated by an individual convolutional neural network;

generate a final high resolution image based on the one or more intermediate high resolution image and the low resolution image using an additional convolutional neural network;

receive a signal from a user device requesting capture of the intermediate high resolution image;

generate the final high resolution image after receiving the signal from the user device; and transmit the final high resolution image to a display device for display thereby.

16. The system of claim 15, wherein the instructions further cause the processor to:

generate the intermediate high resolution image utilizing an individual convolutional neural network; and store the intermediate high resolution image in a buffer.

17. The system of claim 16, wherein the instructions further cause the processor to:

receive a signal from a user device requesting capture of the intermediate high resolution image;

retrieve the intermediate high resolution image from the buffer; and generate the final high resolution image after receiving the signal from the user device based on the intermediate high resolution image from the buffer.

18. The system of claim 15, wherein the instructions further cause the processor to store the low resolution image in a first buffer.

19. The system of claim 18, wherein the instructions further cause the processor to:

generate the intermediate high resolution image utilizing a first individual convolutional neural network;

store the intermediate high resolution image in a second buffer;

receive a signal from a user device requesting capture of the intermediate high resolution image;

retrieve the low resolution image from the first buffer; and generate another intermediate high resolution image by a second individual convolutional neural network.

20. The system of claim 19, wherein the instructions further cause the processor to:

apply a first fusion layer with a first convolution kernel to an output image of the first individual convolutional neural network to generate a first data set;

apply a second fusion layer with a second convolution kernel to an output image of the second individual convolutional neural network to generate a second data set; and merge the first data set and the second data set to generate the final high resolution image.

* * * * *